United States Patent
Starkey

(10) Patent No.: US 11,062,492 B2
(45) Date of Patent: Jul. 13, 2021

(54) METHOD OF IMAGE PRODUCTION

(71) Applicant: ARM LIMITED, Cambridge (GB)

(72) Inventor: Brian Paul Starkey, Cambridge (GB)

(73) Assignee: ARM LIMITED, Cambridge (GB)

( * ) Notice: Subject to any disclaimer, the term of this patent is extended or adjusted under 35 U.S.C. 154(b) by 0 days.

(21) Appl. No.: 16/191,227

(22) Filed: Nov. 14, 2018

(65) Prior Publication Data

US 2019/0147633 A1    May 16, 2019

(30) Foreign Application Priority Data

Nov. 15, 2017  (GB) ..................... 1718896

(51) Int. Cl.
| | |
|---|---|
| *G06T 11/60* | (2006.01) |
| *G06T 7/20* | (2017.01) |
| *G06T 7/70* | (2017.01) |
| *G06T 15/50* | (2011.01) |

(52) U.S. Cl.
CPC ............... *G06T 11/60* (2013.01); *G06T 7/20* (2013.01); *G06T 7/70* (2017.01); *G06T 15/503* (2013.01)

(58) Field of Classification Search
None
See application file for complete search history.

(56) References Cited

U.S. PATENT DOCUMENTS

| | | | | |
|---|---|---|---|---|
| 2013/0127826 A1* | 5/2013 | Walton | ................ | G06T 19/20 345/419 |
| 2014/0321561 A1* | 10/2014 | Stec | .................... | H04N 19/597 375/240.29 |
| 2015/0149956 A1* | 5/2015 | Kempinski | ............. | G06F 3/017 715/784 |
| 2018/0109751 A1* | 4/2018 | Choi | .................... | H04N 5/4403 |
| 2019/0114840 A1* | 4/2019 | Zankowski | ............. | G06T 19/20 |

FOREIGN PATENT DOCUMENTS

| | | |
|---|---|---|
| CN | 106658170 A | 5/2017 |
| WO | 2006111893 A1 | 10/2006 |

OTHER PUBLICATIONS

Developer Oculus website—Hybrid Monoscopic Rendering (Mobile) https://developer.oculus.com/documentation/unreal/latest/concepts/unreal-hybrid-monoscopic/.
GB Search Report dated May 11, 2018 for GB Application No. GB1718896.2.

* cited by examiner

*Primary Examiner* — Jennifer Mehmood
*Assistant Examiner* — Jed-Justin Imperial
(74) *Attorney, Agent, or Firm* — EIP US LLP

(57) ABSTRACT

Aspects of the present disclosure relate to a method for producing an output image representing a scene. The method comprises rendering a plurality of component images. Each component image corresponds to an associated depth within the scene. The method comprises determining one or more elements of a view pose to which an output image is to correspond, and deriving an output image part from each of the plurality of component images based on the determined one or more elements. The method then comprises overlaying each of the output image parts, to produce the output image.

13 Claims, 6 Drawing Sheets

METHOD OF IMAGE PRODUCTION

CROSS-REFERENCE TO RELATED APPLICATIONS

This application claims the benefit under 35 U.S.C. § 119(a) and 37 CFR § 1.55 to United Kingdom patent application no. 1718896.2, filed on Nov. 15, 2017, the entire content of which is incorporated herein by reference.

BACKGROUND OF THE INVENTION

Field of the Invention

The present disclosure relates to methods, apparatus and computer readable storage media for producing images.

Description of the Related Technology

In order to produce an output image representing a scene and corresponding to a given view pose, for example for output to a virtual reality display, a process of rendering the image may begin some time before the image is to be displayed. For example, the rendering may require 20 milliseconds or more, which may correspond to multiple display frames. If the view pose changes during the rendering period, for example because a user of a virtual reality display moves their head, the resulting latency can cause the rendered image to not properly reflect the changed view pose: in effect, the rendered image lags behind the user's movement. This lag can negatively impact viewer experience and cause physical effects such as dizziness and nausea.

In order to address this lag, it is possible to transform the rendered image, based on detection of the changed view pose, or at least one or more elements of the view pose, immediately before outputting the image to a display. Such an operation is variously referred to as "asynchronous reprojection", "time warp" or "space warp". Provided the transform operation is significantly faster than the rendering process, the output image may more accurately reflect the view pose and the user experience may thereby be improved. However, there remains a need for improved methods for producing such an output image.

SUMMARY

In a first embodiment, there is provided a method for producing an output image representing a scene. The method comprises: rendering a plurality of component images, each component image corresponding to an associated depth within the scene; determining one or more elements of a view pose to which an output image is to correspond; deriving an output image part from each of the plurality of component images based on the determined one or more elements; and overlaying each of the output image parts, to produce the output image.

In a second embodiment, there is provided an apparatus for producing an output image representing a scene. The apparatus comprises: a rendering module configured to render a plurality of component images, each component image corresponding to an associated depth within the scene; a pose element determination module configured to determine one or more elements of a view pose to which an output image is to correspond; an image deriving module configured to derive an output image part from each of the plurality of component images based on the determined one or more elements; and an overlaying module configured to overlay each of the output image parts, to produce the output image.

In a third embodiment, there is provided a non-transitory computer-readable storage medium comprising a set of computer-readable instructions stored thereon which, when executed by at least one processor, cause the at least one processor to process image data comprising data corresponding to a three-dimensional object to: render a plurality of component images, each component image corresponding to an associated depth within the scene; determine one or more elements of a view pose to which an output image is to correspond; derive an output image part from each of the plurality of component images based on the determined one or more elements; and overlay each of the output image parts, to produce the output image.

DETAILED DESCRIPTION OF CERTAIN INVENTIVE EMBODIMENTS

Figure 1:
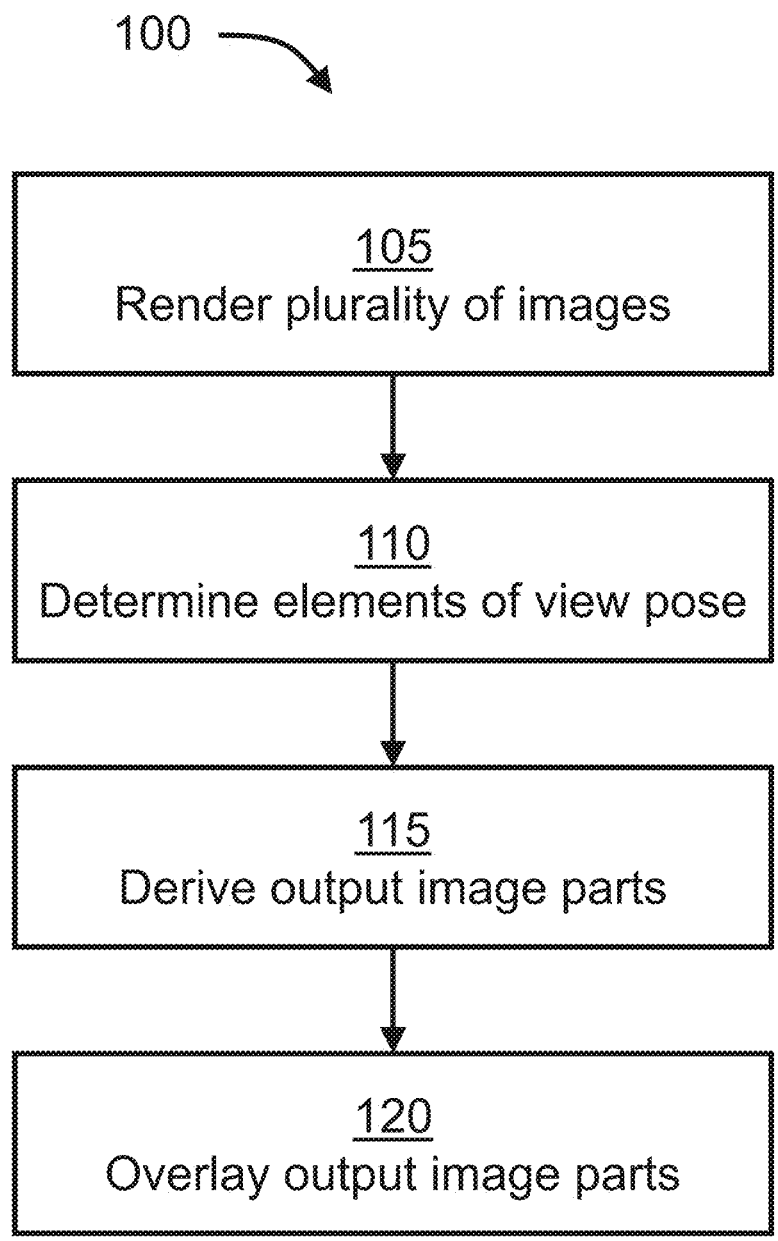
FIG. 1 shows a schematic representation of a method for producing an output image representing a scene.

FIG. 1 shows a schematic representation of a method 100 for producing an output image representing a scene, according to an embodiment.

The method 100 comprises a step 105 of rendering a plurality of component images. Each component image corresponds to an associated depth within the scene. The combined components thus form a representation of the scene which includes depth information (albeit quantized into the component images, which may for example be interpreted as layers of the scene).

The method 100 comprises a step 110 of determining one or more elements of a view pose to which the output image is to correspond. The elements of the view pose correspond to degrees of freedom of motion of a viewer of the image. The elements may thus include any of the three degrees of freedom of three-dimensional position (for example expressed in terms of Cartesian x, y, z coordinates) and the three degrees of freedom of three-dimensional orientation (for example expressed as yaw, pitch and roll). In embodiments, the view pose is determined based at least in part on motion of a viewer, for example based on accelerometers or other movement sensors associated with a virtual reality headset worn by the user. For example, the accelerometers and/or sensors may be internal sensors mounted within the virtual reality headset, or external sensors separate from the virtual reality headset, or any combination thereof.

The method 100 comprises a step 115 of deriving an output image part from each of the plurality of component images based on the determined one or more elements. In some examples, each component image is independently transformed to improve the correspondence with the determined view pose or elements thereof.

The method 100 comprises a step 120 of overlaying each of the output image parts, to produce the output image. The output image is thus efficiently produced whilst accurately corresponding to the determined view pose or elements thereof. In embodiments, the output image is a video frame. For example, the output image may be output as a virtual reality display frame.

Figure 2:
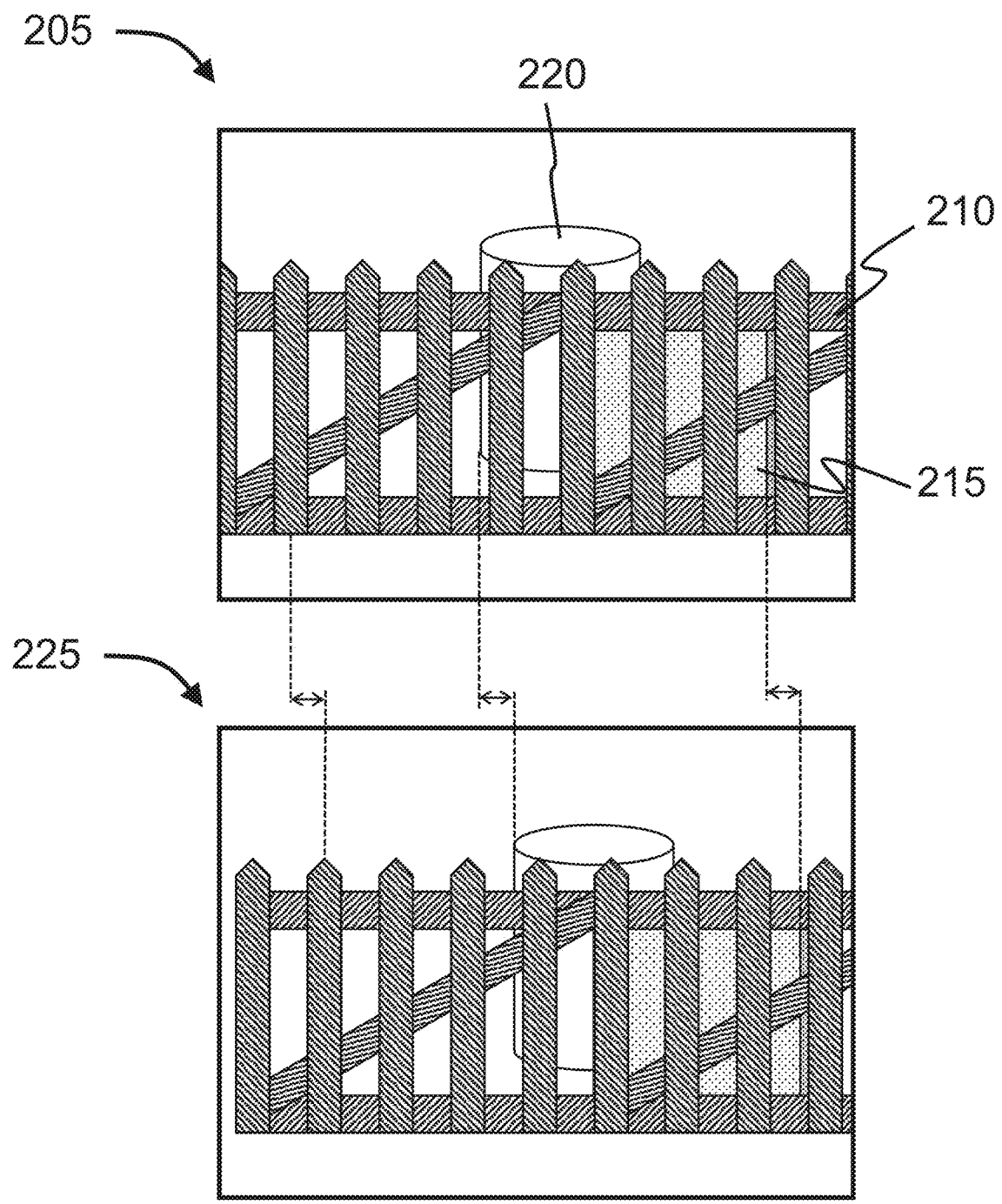
FIG. 2 shows schematically the input and output of a reprojection operation.

FIG. 2 shows schematically the input and output of a reprojection operation that does not comprise rendering component images but instead comprises rendering only a single image.

Image 205 is rendered, for example from a three-dimensional representation of a scene. The image 205 includes various objects: a fence 210 (diagonally hatched) in the foreground, a cube 215 (dotted) in the middle distance, and a cylinder 220 (unshaded) in the background. The objects overlap from the perspective of the view pose, such that the fence 210 occludes portions of the cube 215 and of the cylinder 220, and the cube 215 occludes a portion of the cylinder 220.

The image 205 is transformed in a reprojection operation based on determined elements of a view pose, as set out above, to produce reprojected image 225. In general, such transforms can comprise translation, rotation and/or stretching. In the example of FIG. 2, the reprojected image 225 has been produced by translating the rendered image 205 to the right. This approximates the visual effect of a user moving their head to the left, relative to an initial view pose on which the image 205 is based.

Following the reprojection, each of the fence 210, cube 215 and sphere 220 are positioned to the right of their position in the image 205. Because the image 205 is transformed as a whole during the reprojection operation, each of these objects is positioned the same distance to the right of its position in the image 205.

Although this repositioning approximates the effect of a change in view pose, it produces an unrealistic result because it does not account for parallax. To properly represent parallax effects, the fence 210 in the foreground would move furthest, the cube 215 in the middle distance would move a medium amount, and the cylinder 220 in the background would move the least. Furthermore, even if the image 205 were to be divided into separately transformable areas corresponding to each object, it would not be possible to accurately represent parallax effects because the relative motion of the objects would cause previously-occluded areas to become visible, and vice-versa. For example, a horizontal change in the view pose would cause a change in the portions of the cylinder 220 that are occluded by the fence 210. As the image 205 does not include image data corresponding to occluded portions of the cylinder 220, it would be not be possible to accurately represent a change in view pose that would cause such portions to become visible.

An example reprojection method corresponding to that described above with reference to FIG. 1, capable of accurately representing such parallax effects, will now be described.

As noted above in relation to step 105 in FIG. 1, a plurality of component images are rendered, wherein each component image corresponds to an associated depth within the scene. For example, the scene represented in the image 205 of FIG. 2 has three main depth levels: a foreground comprising a fence 210, a middle-distance level comprising a cube 215, and a background comprising a cylinder 220. A component image may thus be rendered corresponding to each of these depth levels.

Figure 3:
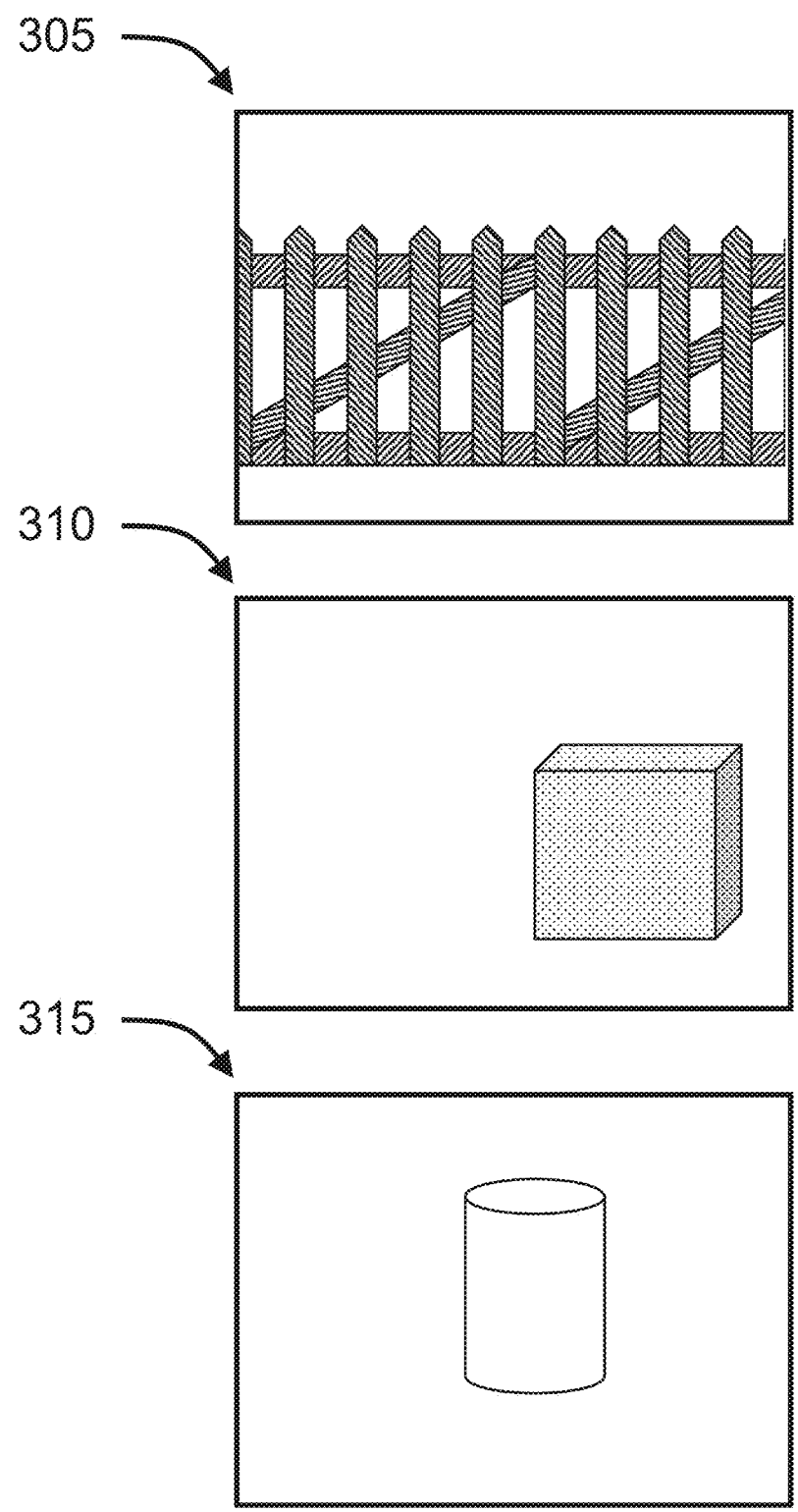
FIG. 3 shows schematically component images corresponding to depth levels within a scene.

FIG. 3 shows schematically component images corresponding to each of these depth levels. Each component image is rendered in an associated plane which has an orientation substantially perpendicular to a view direction corresponding to the output image. Each component image thus corresponds to a vertically oriented layer of the scene.

A first component image 305 corresponds to the foreground of the scene, and comprises only the fence. A second component image 310 corresponds to the middle-distance region of the scene, and comprises only the cube. Finally, a third component image 315 corresponds to the background of the scene, and comprises only the cylinder.

In embodiments, rendering the plurality of component images 305, 310, 315 comprises two-dimensionally rendering each component image of the plurality. The rendering may be based on a three-dimensional representation of the scene, for example stored in a computer memory. Each component image 305, 310, 315 is thus a two-dimensional representation of a vertical "layer" of the three-dimensional scene.

The rendering may thus comprise determining a two-dimensional projection of such a layer of the scene, wherein the layer comprises a plane associated with the given component image 305, 310, 315. By way of example, the foreground layer of the scene comprises the fence object. A two-dimensional projection of this layer is rendered in a plane that represents the layer, thereby forming the foreground component image 305. The nearest and furthest extent of a given layer may be expressed by clip planes, such that objects nearer to the view position than the near clip plane, or further from the view position than the far clip plane are not included in that layer.

Each component image 305, 310, 315 corresponds to a different associated distance, or depth, from a view position, where the view position can be expressed in terms of position elements of the view pose (for example by way of Cartesian x, y, z coordinates). At least one such associated distance or depth is, in some examples, determined based on a position of an object in the scene. For example, the depth of the foreground component image 305 may be determined as a depth corresponding to the fence object, such that the fence object is included entirely in the foreground component image 305 and not in the middle-distance image 310. Similarly, the depth of the middle-distance component image 310 may be determined as a depth corresponding to the cube object, such that the cube object is included entirely in the middle-distance component image 310 and not the in the foreground 305 or background component images. Finally, the depth of the background component image 320 may be determined as a depth corresponding to the cylinder object, such that the cylinder object is included entirely in the background component image 320 and not in the middle-distance image 310.

Similarly, in some examples the number of component images is determined based on a layout of objects in the scene. In the example of FIG. 3, the scene comprises three objects that are separated in their distance from the view pose, and so the three objects can be separately represented in three respective component images 305, 310, 315. In an example in which the cylinder and cube are positioned at the same distance from the view pose, they may be included in the same component image, with a second component image comprising the fence object. Such a scene could thus be represented by two component images. Conversely, if the scene comprises a fourth object at a fourth distance from the view pose, the fourth object could be included in a fourth component image. Realistic scenes may comprise many more objects than this: in such examples, the number of component images can be selected based on a trade-off between the required computing resources and the accuracy of the final output image. In examples, the number and/or depth of the component images is updated in real time, based on changing configurations of objects in the scene.

In examples such as that of FIG. 3, in which the objects occupy only portions of each component image 305, 310, 315, the size or extent of the component images 305, 310, 315 may be reduced to only cover the portions corresponding to the objects. The processing power required to process the images is thus reduced. Alternatively, the portions that do not correspond to objects may be represented as transparent regions.

As noted above in relation to steps 110 in FIG. 1, one or more elements of a view pose are then determined corresponding to the output image.

In some examples, the method comprises determining one or more elements of a predicted view pose, prior to rendering the component images 305, 310, 315. For example, where the method is implemented in a virtual reality system, the predicted elements may represent the actual detected position of a user's head at the beginning of the rendering process. As another example, the predicted elements may be based on a predicted position of the user's head at the end of the rendering process, for example based on the actual position at the beginning of the rendering process along with the detected motion of the user's head. The component images 305, 310, 315 are then rendered based on the one or more predicted view pose elements.

In the present example, the determining one or more elements of a view pose comprises detecting one or more elements of a view pose. An output image part is derived from each of the plurality of component images 305, 310, 315 based on the detected view pose elements. The deriving comprises deriving the output image parts based on a difference between the one or more predicted view pose elements and the one or more detected view pose elements. In embodiments, each output image part is derived by independently translating, rotating and/or stretching a given component image 305, 310, 315. In effect, this comprises performing a separate reprojection operation for each component image 305, 310, 315. The output image parts are then overlaid to produce an output image, as noted above in relation to step 120 in FIG. 1.

Figure 4:
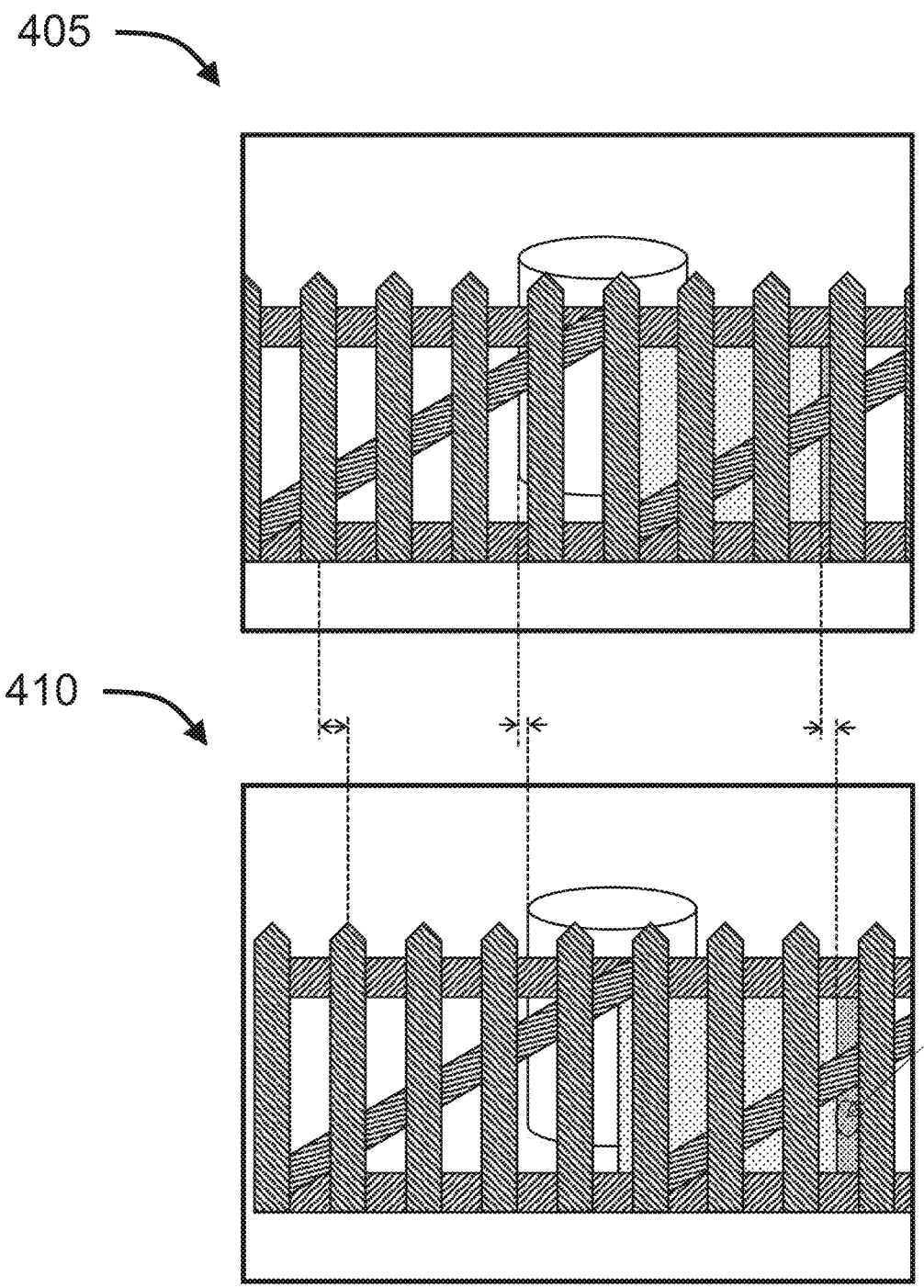
FIG. 4 shows a schematic example of deriving and overlaying of output image parts.

FIG. 4 shows a schematic example of the deriving and overlaying of output image parts. Image 405 shows an overlaying of the component images 305, 310, 315, before any reprojection transformation operations are performed. This image 405 thus corresponds to the rendered scene 205 of FIG. 2, and may for example represent the scene corresponding to predicted view pose elements as described above.

The view pose following the rendering process, for example detected as described above, corresponds to a horizontal movement of the user's head, in a similar manner to the example described above in relation to FIG. 2. Each component image 305, 310, 315 is translated independently to take into account depth-dependent effects such as the parallax effects described above. Specifically, the component image 305 corresponding to the foreground is translated the largest amount, the component image 310 corresponding to the middle distance is translated a medium amount, and the component image 315 corresponding to the background is translated the smallest amount. Three output image parts are thus produced.

The output image parts are overlaid to produce the output image 410, on which is shown the relative translations of the objects in each component image 305, 310, 315 with respect to their positions in the image 405. The parallax effects are thus correctly reflected. For example, some areas of the background cylinder object that were occluded in the image 405 are visible in the output image 410, and some areas of the background cylinder object that were visible in the image 405 are occluded in the output image 410. Such layer-based transformation is typically significantly faster than the rendering of the component images 305, 310, 315, and so can be used as a reprojection operation to reduce the perceived lag between a user's movement and the reflection of that movement in the output image.

The increased accuracy of the representation reduces the visible inconsistency between user motion and the displayed image, improving user experience and reducing unpleasant physical symptoms such as nausea and dizziness.

In some embodiments, the method comprises producing a second output image corresponding to a second video frame. Producing the second output image comprises determining a portion of at least one component image of the plurality as corresponding to a portion of the scene with relatively low movement. This portion is then re-used to produce the second output image. In this manner, the rate of updating a given component image can be changed depending on the degree of motion in that image, with component images corresponding to previous frames being re-used where possible. In effect, this allows component images comprising moving elements to be rendered frame-by-frame whilst static component images, for example comprising background elements of the scene, are rendered only once, thereby reducing processing requirements.

In some such examples, a moving object may be tagged as such and be assigned a dedicated component image, with a depth varying from frame to frame depending on the depth of that object within the scene. Alternatively or additionally, where a given component image does not rapidly change, that component image may be re-rendered at regular intervals of several frames, with any motion between re-rendering being represented by reprojection transforms as described above. The required processing power may thus be significantly reduced.

Figure 5:
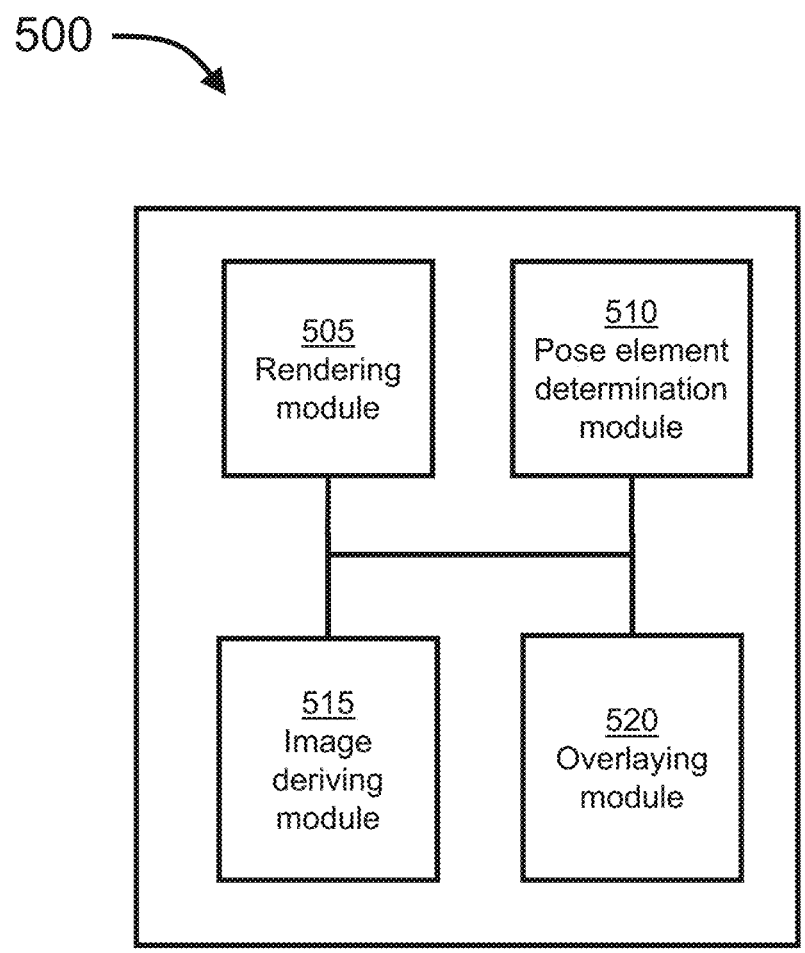
FIG. 5 shows a schematic representation of an apparatus for producing an output image representing a scene.

FIG. 5 shows a schematic representation of an apparatus 500 for producing an output image representing a scene, according to an embodiment. The apparatus 500 may for example be implemented by dedicated hardware, such as an application-specific integrated circuit. In other examples, the apparatus 500 is implemented in general purpose hardware, for example as software executed by a graphics processing unit or central processing unit of a general purpose computer. The modules of the apparatus 500 may comprise any combination of dedicated hardware and routines within more general hardware. In some embodiments, the apparatus forms a component of a display system such as a virtual reality system.

The apparatus 500 comprises a rendering module 505 configured to render a plurality of component images. Each component image corresponds to an associated depth within the scene.

The apparatus 500 comprises a pose element determination module 510 configured to determine one or more elements of a view pose to which an output image is to correspond.

The apparatus 500 comprises an image deriving module 515 configured to derive an output image part from each of the plurality of component images based on the determined one or more elements.

The apparatus 500 comprises an overlaying module 520 configured to overlay each of the output image parts, to produce the output image. The output image may then be output to a display controller.

The apparatus 500 can thus be utilized to carry out the methods described in detail above.

The apparatus 500 may comprise a position detector configured to determine a user view position. In such examples, the pose element determination module 510 is configured to determine the view pose elements based on the user view position.

Figure 6:
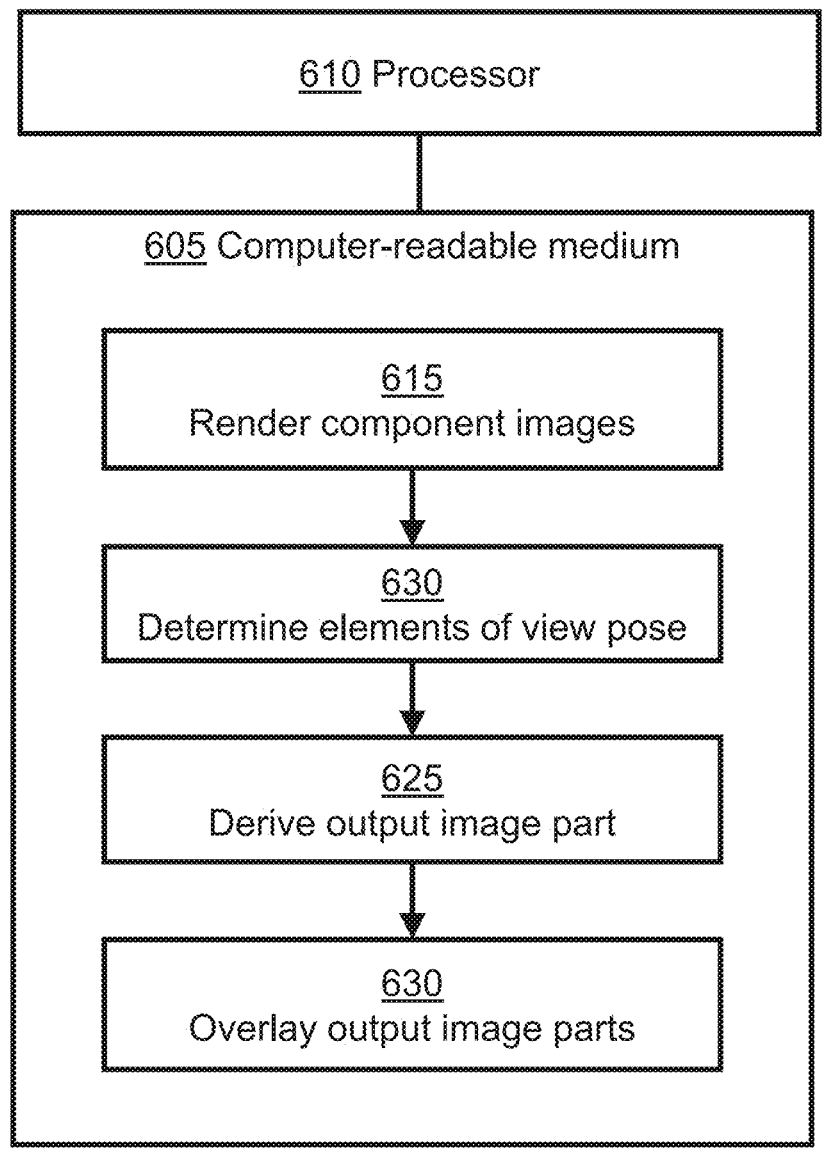
FIG. 6 shows an example of a non-transitory computer-readable storage medium according to an example.

FIG. 6 shows an example of a non-transitory computer-readable storage medium 605 comprising a set of computer readable instructions which, when executed by at least one processor 610, cause the at least one processor 610 to perform a method according to examples described herein. The computer readable instructions may be retrieved from machine-readable media, e.g. any media that can contain, store, or maintain programs and data for use by or in connection with an instruction execution system. In this case, machine-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

At block 615, the instructions cause the processor 610 to render a plurality of component images. Each component image corresponds to an associated depth within the scene.

At block 620, the instructions cause the processor 610 to determine one or more elements of a view pose to which an output image is to correspond.

At block 625, the instructions cause the processor 610 to derive an output image part from each of the plurality of component images based on the determined one or more elements.

At block 630, the instructions cause the processor 610 to overlay each of the output image parts, to produce the output image.

The above embodiments are to be understood as illustrative examples. Further embodiments are envisaged. For example, a plurality of component images as described above in relation to FIG. 3 may comprise a first component image corresponding to a first distance from a view position and a second component image corresponding to a second, larger, distance from a view position. The second component image may then have a lower resolution than the first component image, thereby improving computing efficiency whilst minimizing detrimental consequences to perceived image quality. Alternatively or additionally, a foreground component image may be rendered with a wider field of view than a background component image, in order to provide more of a buffer for potential translation during the reprojection operation.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the disclosure.

What is claimed is:

1. A method of producing an output image to be displayed on a virtual reality display, the output image representing a scene to be viewed by a user of the virtual reality display, the method comprising:
   prior to rendering a plurality of component images, determining one or more predicted elements of a predicted view pose based at least in part on a detected motion of the user;
   rendering a plurality of component images based on the one or more predicted elements, each component image corresponding to an associated depth within the scene;
   subsequently detecting one or more elements of a view pose, corresponding to degrees of freedom of motion of the user, to which the output image is to correspond;
   deriving an output image part from each of the plurality of component images based on a difference between the one or more predicted elements and the one or more detected elements; and
   overlaying each of the output image parts, to produce the output image corresponding to the determined one or more elements of the view pose; and
   outputting the output image as a virtual reality display frame.

2. A method according to claim 1, wherein each component image is rendered in an associated plane which has an orientation substantially perpendicular to a view direction corresponding to the output image.

3. A method according to claim 2, wherein rendering a given component image of the plurality comprises determining a two-dimensional projection of a layer of the scene, the layer comprising the plane associated with the given component image.

4. A method according to claim 1, wherein rendering the plurality of component images comprises two-dimensionally rendering each component image of the plurality.

5. A method according to claim 1, wherein the rendering is based on a three-dimensional representation of the scene.

6. A method according to claim 1, wherein each component image of the plurality corresponds to a different associated distance from a view position; and
   the method comprises determining at least one said associated distance based on a position of an object in the scene.

7. A method according to claim 1, wherein deriving the output image parts comprises performing a virtual reality reprojection process.

8. A method according to claim 1, wherein:
   the plurality of component images comprises a first component image corresponding to a first distance from a view position and a second component image corresponding to a second, larger, distance from a view position; and
   the second component image has a lower resolution than the first component image.

9. A method according to claim 1, comprising determining the number of component images of the plurality based on a layout of objects in the scene.

10. A method according to claim 1, wherein the output image is a video frame.

11. A method according to claim 10, comprising producing a second output image corresponding to a second video frame, wherein producing the second output image comprises:

determining a portion of at least one component image of the plurality as corresponding to a portion of the scene with relatively low movement; and re-using said portion to produce the second output image.

12. An apparatus to produce an output image to be displayed on a virtual reality display, the output image representing a scene to be viewed by a user of the virtual reality display, the apparatus comprising:

a pose element determination module configured to;

determine one or more predicted elements of a predicted view pose based at least in part on a user view position;

subsequently detect one or more elements of a view pose, corresponding to degrees of freedom of motion of a viewer of the output image, to which an output image is to correspond;

a rendering module configured to render a plurality of component images based on the one or more predicted elements, each component image corresponding to an associated depth within the scene;

a position detector configured to determine the user view position;

an image deriving module configured to derive an output image part from each of the plurality of component images based on a difference between the one or more predicted elements and the one or more detected elements; and an overlaying module configured to overlay each of the output image parts, to produce the output image corresponding to the detected one or more elements of the view pose.

13. A non-transitory computer-readable storage medium comprising a set of computer-readable instructions stored thereon which, when executed by at least one processor, cause the at least one processor to process image data comprising data corresponding to a three-dimensional object to:

prior to rendering a plurality of component images, determine one or more predicted elements of a predicted view pose based at least in part on a detected motion of a user;

render a plurality of component images based on the one or more predicted elements, each component image corresponding to an associated depth within a scene;

subsequently detect one or more elements of a view pose, corresponding to degrees of freedom of motion of a viewer of an output image, to which the output image is to correspond;

derive an output image part from each of the plurality of component images based on a difference between the one or more predicted elements and the one or more detected elements; and overlay each of the output image parts, to produce the output image corresponding to the detected one or more elements of the view pose; and output the output image as a virtual reality display frame.

* * * * *